United States Patent
Causemann

(10) Patent No.: US 6,854,722 B2
(45) Date of Patent: Feb. 15, 2005

(54) SUSPENSION STRUT UNIT WITH HEIGHT-ADJUSTABLE SPRING COLLAR

(75) Inventor: Peter Causemann, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/600,136

(22) Filed: Jun. 20, 2003

(65) Prior Publication Data

US 2004/0051270 A1 Mar. 18, 2004

(30) Foreign Application Priority Data

Jun. 21, 2002 (DE) .......................................... 102 27 713

(51) Int. Cl.⁷ .............................................. B61H 13/36
(52) U.S. Cl. .................................. 267/221; 280/124.146
(58) Field of Search ................................ 267/221, 226; 280/124.146

(56) References Cited

U.S. PATENT DOCUMENTS

| | | | | |
|---|---|---|---|---|
| 2,624,592 A | * | 1/1953 | MacPherson | ............... 180/359 |
| 4,995,583 A | * | 2/1991 | De La Fuente | ............. 248/636 |
| 5,544,725 A | * | 8/1996 | Handke et al. | ............. 267/221 |
| 5,553,713 A | * | 9/1996 | Sydekum et al. | ........... 267/221 |
| 5,607,035 A | * | 3/1997 | Fulks et al. | ............ 188/322.19 |

* cited by examiner

Primary Examiner—Robert A. Siconolfi
(74) Attorney, Agent, or Firm—Cohen, Pontani, Lieberman & Pavane

(57) ABSTRACT

A suspension strut includes a cylinder; a chamber surrounding the cylinder, the chamber being at least partially filled with hardenable material; and a spring collar having a sleeve section which is received in the hardenable material so that said material, in a solid state, transmits a supporting force from the cylinder to the spring collar. The sleeve section has a radial clearance with respect to said cylinder, so that sleeve section can be installed in said chamber at a predetermined angle to said cylinder.

12 Claims, 2 Drawing Sheets

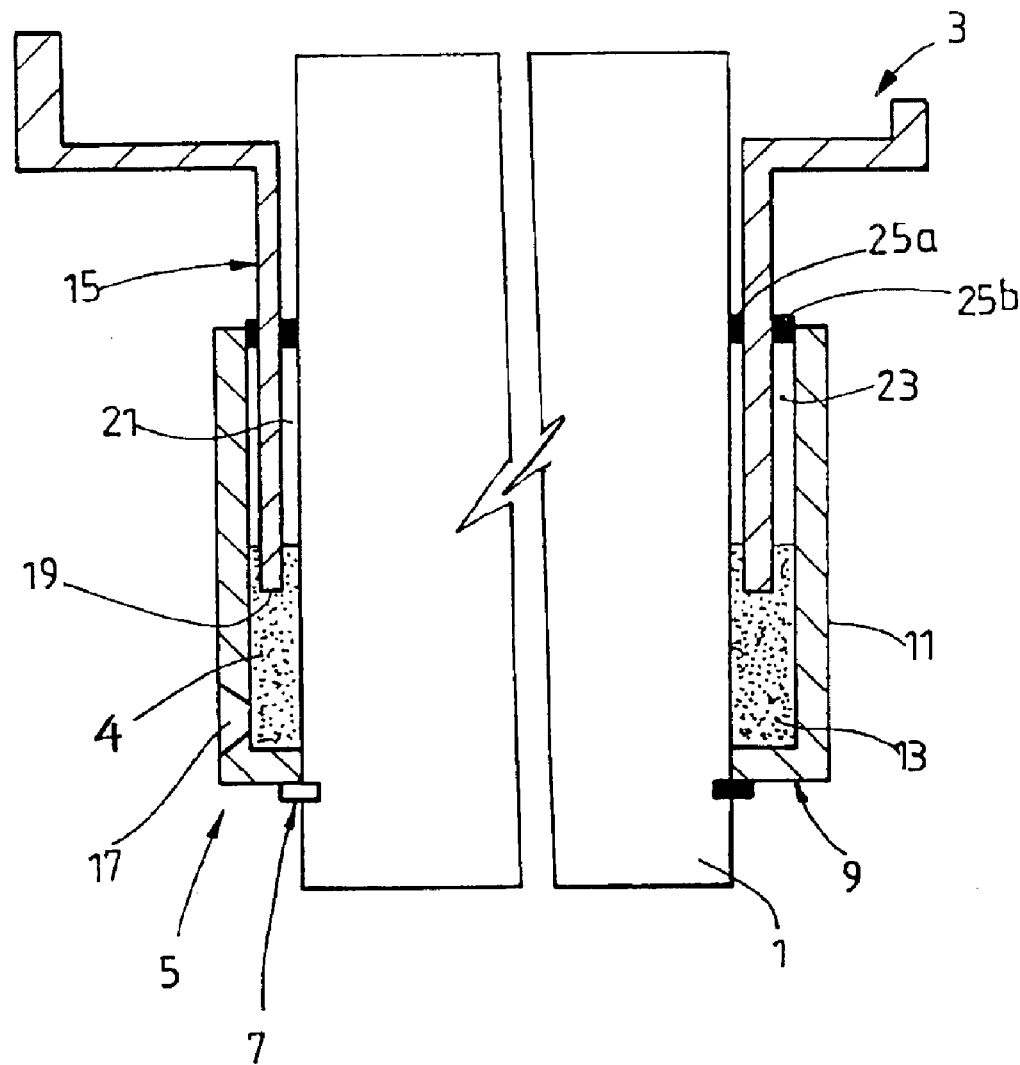

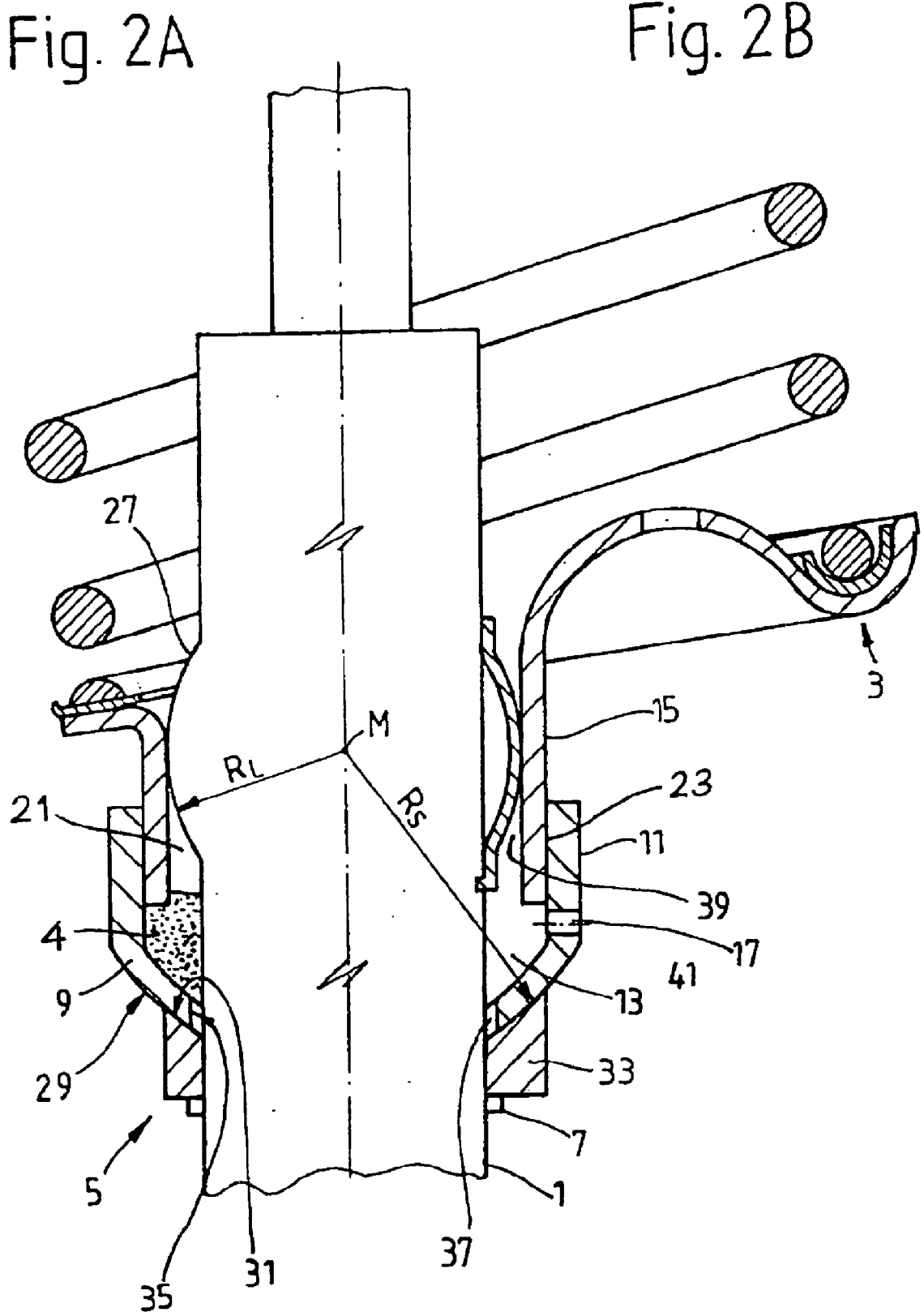

SUSPENSION STRUT UNIT WITH HEIGHT-ADJUSTABLE SPRING COLLAR

BACKGROUND OF THE INVENTION

1. Field of the Invention

The present invention relates to a suspension strut of the type including a cylinder; a chamber surrounding the cylinder, the chamber being at least partially filled with hardenable material; and a spring collar having a sleeve section which is received in the hardenable material so that said material, in a solid state, transmits a supporting force from the cylinder to the spring collar.

2. Description of the Related Art

A suspension strut unit with a detachable spring collar is disclosed in DE 85 10 058 U1, wherein the spring collar is supported by a retaining ring. The retaining ring in turn can be attached independently of the spring collar to the cylinder of the suspension strut unit, whereupon the overall structural unit thus formed is painted. The height of the spring collar is determined by the retaining ring and cannot be changed.

DE 198 51 019 C1 discloses a suspension strut unit with a cylinder which carries a retaining ring for a spring collar, which can be adjusted and held in place permanently in the desired position. At least one groove is formed in the retaining ring, and at least one circumferential area of a sleeve section of the spring collar can be deformed in the radial direction so that it engages in this groove. The distance by which the groove extends along the sleeve section determines the maximum degree to which the height of the spring collar can be adjusted.

DE 197 44 757 A1, furthermore, describes a spring assembly for motor vehicles, in which the height of a spring collar can be actively changed by the use of a hydraulic medium. A spring assembly of this type is intended especially for luxury class vehicles. For these types of vehicles, it must be expected that the spring collar will be adjusted relatively often as part of the process of regulating the level of the vehicle body.

SUMMARY OF THE INVENTION

It is an object of the present invention to provide a suspension strut unit with a height-adjustable spring collar that is especially suitable for making permanent height adjustments.

This object is accomplished according to the invention in that the sleeve section of the spring collar can be installed inside the chamber at an acute angle to the cylinder.

This object is accomplished according to the invention in that the sleeve section of the spring collar can be installed inside the chamber at an angle to the cylinder.

It thus becomes possible not only to adjust the height of the spring collar but also to adjust its angle with respect to the longitudinal axis of the suspension strut unit. It is therefore possible, for example, to set a compensation for the transverse force with respect to the elastic force of the vehicle suspension spring.

A sleeve section of the spring collar has radial clearance with respect to the cylinder; this radial clearance limits the maximum angle of the spring collar.

In addition, the sleeve section of the spring collar can be separated from the chamber by a certain radial gap. This achieves the object of orienting the angle of the chamber independently of the angle to which the spring collar is set.

It is advantageous for the cylinder-side chamber to be formed by a support ring, which is permanently connected axially to the cylinder.

In addition, the support ring has a sleeve and a base, and the sleeve section is held at least partially inside the sleeve of the support ring.

According to one embodiment, the chamber has seals for sealing the radial clearance between the sleeve section and the cylinder and/or the radial gap between the sleeve section and the sleeve. This is done to prevent the uncontrolled escape of the hardenable material.

As an alternative, it is also possible for the radial clearance between the sleeve section of the spring collar and the cylinder to be at least almost completely closed off by a convexly shaped bearing area.

The bearing area can be formed integrally with the cylinder.

When the number of units is relatively small, however, there is also the advantageous possibility of using a separate bearing element to form the bearing area.

A support ring, which is supported at an adjustable angle to the cylinder, offers the advantage that a very small radial gap can be obtained between the support ring and the sleeve section of the spring collar.

Thus, the base of the support ring has a spherical bearing surface, which is supported in turn on a bearing disk with a cup-shaped bearing surface. The bearing disk absorbs the axial forces of the spring collar and also seals off the base of the support ring.

To ensure optimal support of the support ring and the spring collar, the radii of curvature of the spherical bearing contour of the support ring and of the convex bearing area between the cylinder and the sleeve section of the spring collar have a common center point.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 1A and 1B are a partial cross-sectional views of different spring collars settable at an angle to the cylinder; and FIGS. 2A and 2B are a partial cross-sectional views of a spring collar with a bearing area which allows the chamber to be set at an angle.

DETAILED DESCRIPTION OF THE PRESENTLY PREFERRED EMBODIMENTS

FIGS. 1A and 1B show only a section of a cylinder 1, which carries a spring collar 3. The cylinder 1 may be part of a vibration damper or of a pneumatic spring. Inside the cylinder 1, a piston is free to move axially back and forth, or a coaxial pressure tube can be provided, in which a working medium is sealed.

A support ring 5 is attached to the cylinder 1; various means of attachment can be used. In this case a retaining ring 7 is shown, but a weld could also be used. The support ring 5 includes of a base 9 and a sleeve 11, so that the support ring 5 and the cylinder 1 together form an annular chamber 13. The bottom end of the sleeve section 15 of the spring collar 3 fits inside the chamber 13 and is guided there with freedom of axial movement. Via the connecting opening 17 in the support ring 5, the chamber 13 is filled with a hardenable material 4 up to at least the bottom end 19 of the sleeve section 15. Hardenable materials which can be used include liquid plastics and curable metallic materials.

Between the cylinder 1 and the sleeve section 15 there is a defined amount of radial clearance 21. In addition, the sleeve section 15 is separated by a radial gap 23 from the sleeve 11 inside the chamber 13. The spring collar 3 can thus be installed inside the chamber 13 at an angle to the cylinder 1. Seals 25a, 25b seal off the radial clearance 21 and the radial gap 23, so that no hardenable material 4 can escape from the chamber 13.

When the cylinder 1 is a component of a vibration damper, a retaining device (not shown), for example, is placed on the spring collar 3 to level the vehicle horizontally at the end of the vehicle assembly process. As this is done, the sleeve section 15 of the spring collar 3 slides inside the chamber 13. After the height of the spring collar 3 and its angle to the cylinder 1 have been adjusted to the desired values, the chamber 13 is filled with the hardenable material 4 at least up as far as the bottom end 19 of the sleeve section 15. As soon as the hardenable material 4 has cured sufficiently, the retaining device can be removed. The vehicle is now level, regardless of what equipment and accessories it may have in the individual case. During the adjustment process, the sleeve 11, which forms the outside boundary of the chamber 13, remains almost completely concentric with respect to the cylinder 1.

In alternative embodiments of FIGS. 2A and 2B, the radial clearance 21 between the sleeve section 15 of the spring collar 3 is at least almost completely closed off adjacent to a circumferential convex bearing area 27. In addition, the base 9 has a spherical bearing surface 29, which is supported on a cup-shaped bearing surface 31 of a bearing disk 33 attached to the cylinder 1. The radii of curvature $R_1$, $R_S$ of the convex bearing area 27 and the cup-shaped bearing surface 31 have the same center M, so that the sleeve 11 and the chamber 13 can be moved around the center M to the desired angle with respect to the cylinder 1 synchronously with the sleeve section 15 of the spring collar 3 without jamming. The radial gap 23 between the sleeve section 15 and the chamber 13 is essentially absent to ensure effective centering. The base 9 of the support ring 5 has a pass-through opening 35 which is larger than the diameter of the cylinder 1. The gap 37 between the pass-through opening 35 and the cylinder 1 is sealed by the bearing disk 33.

In FIG. 2A, the convex bearing area 27 is formed by the walls of the cylinder 1. As shown in FIG. 2B it is also possible to use a separate bearing element 39 with a convexly shaped bearing area, which is supported, for example, on a retaining ring 41 or possibly even directly on the base 9.

The height and angle of the spring collar 3 are adjusted in the same way as described in connection with FIGS. 1A and 1B. As the adjustment is being done, the inside walls of the sleeve section 15 slide along the convex bearing area 27. As in FIGS. 1A and 1B, a hardenable material 4 is introduced in chamber 13 through opening 17 to a level at least the bottom end 19 of sleeve section 15.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension strut comprising:
    a cylinder;
    a chamber surrounding said cylinder, said chamber being at least partially filled with hardenable material; and
    a spring collar having a sleeve section which is received in said hardenable material so that said material, in a solid state, transmits a supporting force from the cylinder to the spring collar;
    wherein said sleeve section is received in said chamber with a radial clearance between the sleeve section and the cylinder so that the sleeve section can be installed in said chamber at an acute angle to said cylinder.

2. A suspension strut as in claim 1, wherein the radial clearance limits said acute angle.

3. A suspension strut as in claim 1 further comprising a support ring which is axially fixed to said cylinder, said support ring and said cylinder forming said chamber.

4. A suspension strut as in claim 3 wherein said support ring comprises a base and a sleeve, said sleeve section being received between said sleeve and cylinder.

5. A suspension strut as in claim 4 wherein said sleeve section is separated from said sleeve by a radial gap.

6. A suspension strut as in claim 4 further comprising a seal between said sleeve section and said cylinder, and a seal between said sleeve section and said sleeve.

7. The suspension strut unit of claim 2 further comprising a convexly shaped bearing area between said sleeve section and said cylinder, said radial clearance being almost completely closed adjacent to said convexly shaped bearing area.

8. A suspension strut as in claim 7, wherein said bearing area is formed by said cylinder.

9. A suspension strut as in claim 7, wherein said bearing area is formed by a separate bearing element.

10. A suspension strut as in claim 7 further comprising a support ring which is axially fixed to said cylinder, said support ring and said cylinder forming said chamber, said support ring being supported at a predetermined angle with respect to said cylinder.

11. A suspension strut as in claim 10 further comprising a bearing fixed to cylinder, said bearing having a concave bearing surface, said support ring having a convex bearing surface which is supported by said concave bearing surface.

12. A suspension strut as in claim 11 wherein said convex bearing surface and said concave bearing surface have respective radii of curvature with a common center.

* * * * *